United States Patent
Sasaki

(10) Patent No.: US 9,961,219 B2
(45) Date of Patent: May 1, 2018

(54) INFORMATION PROCESSING APPARATUS THAT SUPPLIES IMPORTANT FUNCTION IDENTIFICATION INFORMATION, NON-TRANSITORY COMPUTER READABLE RECORDING MEDIUM THAT RECORDS A PROGRAM CAUSING AN INFORMATION PROCESSING APPARATUS TO SUPPLY IMPORTANT FUNCTION IDENTIFICATION INFORMATION, AND INFORMATION PROCESSING SYSTEM INCLUDING AN INFORMATION PROCESSING APPARATUS THAT SUPPLIES IMPORTANT FUNCTION IDENTIFICATION INFORMATION

(71) Applicant: KYOCERA DOCUMENT SOLUTIONS INC., Osaka (JP)

(72) Inventor: Shunsuke Sasaki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days. days.

(21) Appl. No.: 15/471,810

(22) Filed: Mar. 28, 2017

(65) Prior Publication Data
US 2017/0289373 A1   Oct. 5, 2017

(30) Foreign Application Priority Data
Apr. 1, 2016   (JP) .................... 2016-073972

(51) Int. Cl.
*H04N 1/00* (2006.01)

(52) U.S. Cl.
CPC ....... *H04N 1/00517* (2013.01); *H04N 1/0097* (2013.01); *H04N 1/00244* (2013.01);
(Continued)

(58) Field of Classification Search
CPC ................................................ H04N 1/00517
(Continued)

(56) References Cited

U.S. PATENT DOCUMENTS

2009/0109476 A1*  4/2009  Ando ............... G06F 21/34
  358/1.15
2011/0102826 A1*  5/2011  Fujiwara .......... H04N 1/00222
  358/1.13

FOREIGN PATENT DOCUMENTS

JP    2006-107525 A    4/2006

* cited by examiner

*Primary Examiner* — Jacky X Zheng
(74) *Attorney, Agent, or Firm* — Li & Cai Intellectual Property (USA) Office

(57) ABSTRACT

A function identification information acquisition circuit acquires function identification information for identifying a particular function from one or more electronic apparatuses executing a plurality of functions, the function identification information being associated with one of apparatus identification information for identifying the one or more electronic apparatuses and user identification information for identifying one or more users registered in the one or more electronic apparatuses. An important function selection circuit selects a function with high importance from the plurality of functions based on the acquired function identification information. An important function identification information supply circuit supplies important function identification information to one of an electronic apparatus identified by the apparatus identification information that is not associated with the important function identification information and an electronic apparatus in which user identification information that is not associated with the important function identification information is registered.

6 Claims, 7 Drawing Sheets

(52) U.S. Cl.
CPC ..... *H04N 1/00474* (2013.01); *H04N 1/00854*
(2013.01); *H04N 2201/0094* (2013.01)

(58) Field of Classification Search
USPC ........................................................ 358/1.13
See application file for complete search history.

INFORMATION PROCESSING APPARATUS THAT SUPPLIES IMPORTANT FUNCTION IDENTIFICATION INFORMATION, NON-TRANSITORY COMPUTER READABLE RECORDING MEDIUM THAT RECORDS A PROGRAM CAUSING AN INFORMATION PROCESSING APPARATUS TO SUPPLY IMPORTANT FUNCTION IDENTIFICATION INFORMATION, AND INFORMATION PROCESSING SYSTEM INCLUDING AN INFORMATION PROCESSING APPARATUS THAT SUPPLIES IMPORTANT FUNCTION IDENTIFICATION INFORMATION

CROSS REFERENCE TO RELATED APPLICATION

This application claims the benefit of Japanese Priority Patent Application JP 2016-073972 filed Apr. 1, 2016, the entire contents of which are incorporated herein by reference.

BACKGROUND OF THE INVENTION

1. Field of the Invention

The present disclosure relates to an information processing apparatus capable of communicating with an electronic apparatus that registers a particular function as a favorite function, a non-transitory computer readable recording medium that records a program, and an information processing system.

2. Description of Related Art

Typically, there is known a technology for registering a function with a high use frequency as a favorite function in an electronic apparatus such as an MFP (Multifunction Peripheral).

In the technology for registering a particular function as a favorite function, it is desirable to further improve user-friendliness.

SUMMARY OF THE INVENTION

An information processing apparatus according to an embodiment of the present disclosure includes: a function identification information acquisition circuit that acquires function identification information for identifying a particular function from one or more electronic apparatuses executing a plurality of functions, the function identification information being associated with one of apparatus identification information for identifying the one or more electronic apparatuses and user identification information for identifying one or more users registered in the one or more electronic apparatuses; an important function selection circuit that selects a function with high importance from the plurality of functions based on the acquired function identification information; and an important function identification information supply circuit that supplies important function identification information to one of an electronic apparatus identified by the apparatus identification information that is not associated with the important function identification information and an electronic apparatus in which user identification information that is not associated with the important function identification information is registered, the important function identification information being for identifying the function with high importance.

A non-transitory computer readable recording medium according to an embodiment of the present disclosure records a program, the program causing a computer of an information processing apparatus to operate as: a function identification information acquisition circuit that acquires function identification information for identifying a particular function from one or more electronic apparatuses executing a plurality of functions, the function identification information being associated with one of apparatus identification information for identifying the one or more electronic apparatuses and user identification information for identifying one or more users registered in the one or more electronic apparatuses; an important function selection circuit that selects a function with high importance from the plurality of functions based on the acquired function identification information; and an important function identification information supply circuit that supplies important function identification information to one of an electronic apparatus identified by the apparatus identification information that is not associated with the important function identification information and an electronic apparatus in which user identification information that is not associated with the important function identification information is registered, the important function identification information being for identifying the function with high importance.

An information processing system according to an embodiment of the present disclosure includes: one or more electronic apparatuses that execute a plurality of functions; and an information processing apparatus that communicates with the one or more electronic apparatuses, in which the one or more electronic apparatuses each include a function identification information supply circuit that supplies function identification information for identifying a particular function to the information processing apparatus, the function identification information being associated with one of apparatus identification information for identifying the one or more electronic apparatuses and user identification information for identifying one or more users registered in the one or more electronic apparatus, the information processing apparatus includes a function identification information acquisition circuit that acquires the function identification information from the one or more electronic apparatuses, the function identification information being associated with one of the apparatus identification information and the user identification information, an important function selection circuit that selects a function with high importance from the plurality of functions based on the acquired function identification information, and an important function identification information supply circuit that supplies important function identification information to one of an electronic apparatus identified by the apparatus identification information that is not associated with the important function identification information and an electronic apparatus in which user identification information that is not associated with the important function identification information is registered, the important function identification information being for identifying the function with high importance, and the one or more electronic apparatuses each further include an important function identification information acquisition circuit that acquires the important function identification information from the information processing apparatus, and an important function identification information register circuit that registers one of the acquired important function identification information where the electronic apparatus itself is the electronic apparatus identified by the apparatus identification information that is not associated with the important function identification information, and the acquired important function identification information in relation to the user identification information where the electronic apparatus itself is the electronic apparatus in which user identification information that is not associated with the important function identification information is registered.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, embodiments of the present disclosure will be described with reference to the drawings.

(I. First Embodiment)

(1. Overview of Information Processing System)

Figure 1:
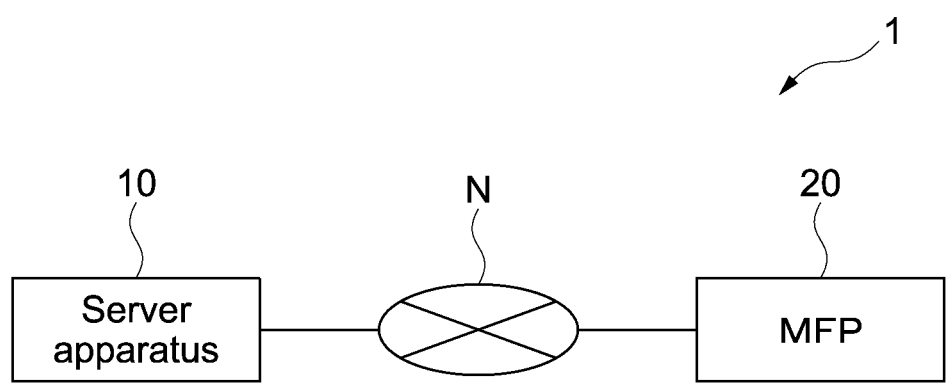
FIG. 1 schematically shows an information processing system according to a first embodiment of the present disclosure.

FIG. 1 schematically shows an information processing system according to a first embodiment of the present disclosure.

An information processing system 1 includes a server apparatus 10 and an electronic apparatus 20.

The electronic apparatus 20 is an image forming apparatus (e.g., MFP (Multifunction Peripheral)) capable of executing a plurality of functions (a printing function, a scan function, a transfer function, a FAX function, etc.), and will be referred to as "MFP 20", hereinafter. The user of the MFP 20 is, for example, an employee who is an end user (hereinafter, referred to simply as "user").

The server apparatus 10 exchanges information with the MFP 20 through bidirectional communication via a network N such as an in-office LAN (Local Area Network) or the Internet. The user of the server apparatus 10 is typically an administrator of the MFP 20 (e.g., a person in charge of managing the MFP 20 in the office).

The MFP 20 is installed in an office. In the office, various users perform user registration for logging in the MFP 20. For example, the MFP 20 accepts user registration of a user A, a user B, and a user C, and stores information on the user registration in a storage device or the like. Each user registers a function that he/she often uses (e.g., a printing function) in the MFP 20 as his/her own favorite function. Meanwhile, a user newly registered in the MFP 20 has registered no function as a favorite function. In this regard, the server apparatus 10 selects a function with high importance for the user newly registered in the MFP 20, and notifies the MFP 20 of the selected function. The MFP 20 allows the user newly registered in the MFP 20 to easily access the function.

(2. Hardware Configuration)

(2-1. Hardware Configuration of Information Processing Apparatus)

Figure 2:
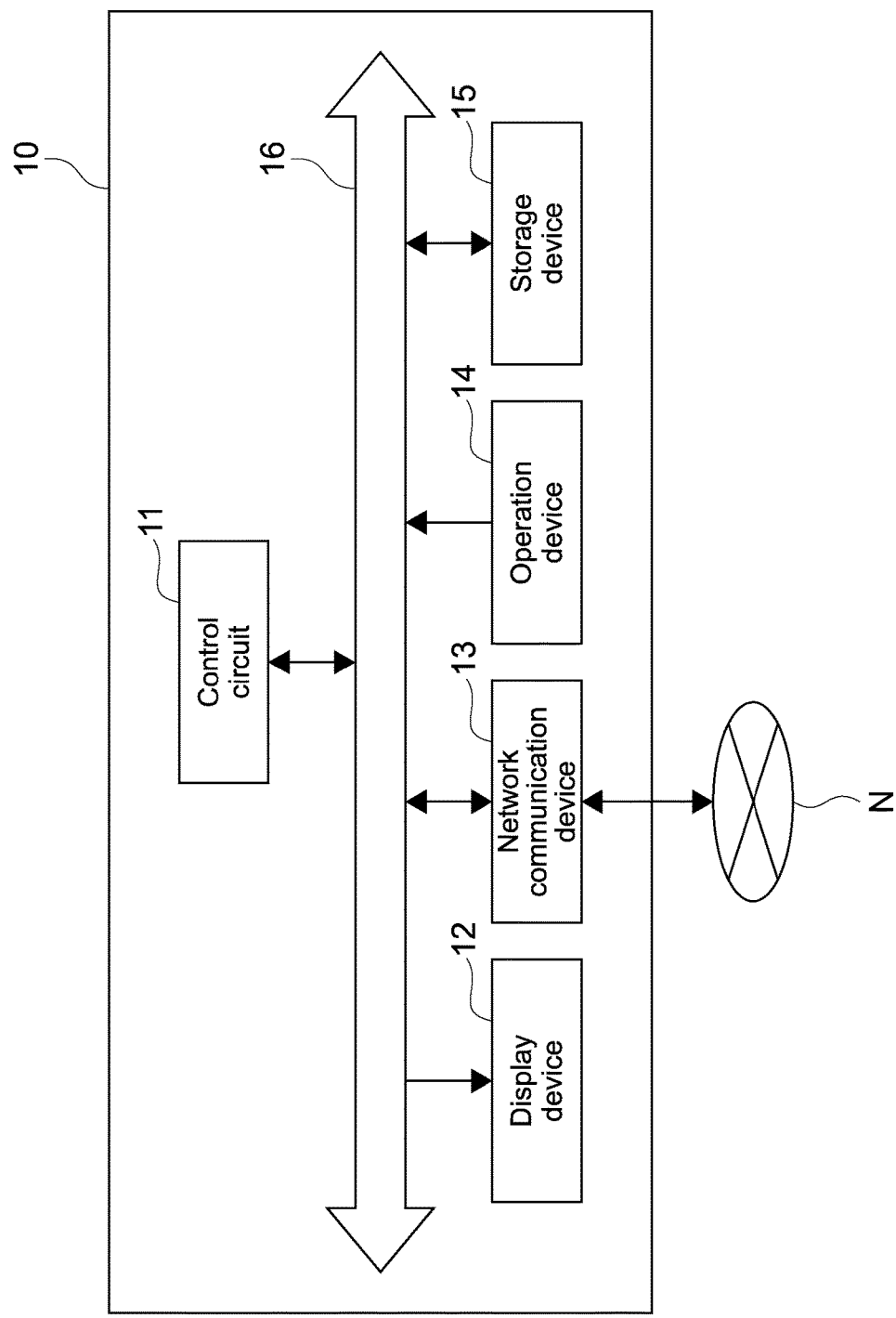
FIG. 2 shows a hardware configuration of an information processing apparatus.

FIG. 2 shows a hardware configuration of the information processing apparatus.

An information processing apparatus 10 has a function as a server apparatus, and will be referred to as "server apparatus 10", hereinafter. The server apparatus 10 includes a control circuit 11, and a display device 12, a network communication device 13, an operation device 14, and a storage device 15 that are connected to the control circuit 11 via a bus 16.

The control circuit 11 includes a CPU (Central Processing Unit) and the like. The control circuit 11 executes programs loaded to a RAM (Random Access Memory).

The display device 12 includes an LCD (Liquid Crystal Display), an organic EL (Electroluminescence) display, or the like. The display device 12 carries out operational processing based on information received from the control circuit 11 and displays generated image signals on a screen. Typically, the display device 12 is an external display device.

The network communication device 13 is an interface used for connecting to the network N.

The operation device 14 includes a keyboard, a mouse, and various switches. The operation device 14 detects user operations and outputs operation signals to the control circuit 11.

The storage device 15 includes a ROM (Read Only Memory), a RAM, and a large-volume storage device such as an HDD (Hard Disk Drive). The ROM is an example of a non-transitory computer readable recording medium, and fixedly stores programs to be executed by the control circuit 11, data, and the like. The programs stored in the ROM are loaded to the RAM.

(2-2. Hardware Configuration of MFP)

Figure 3:
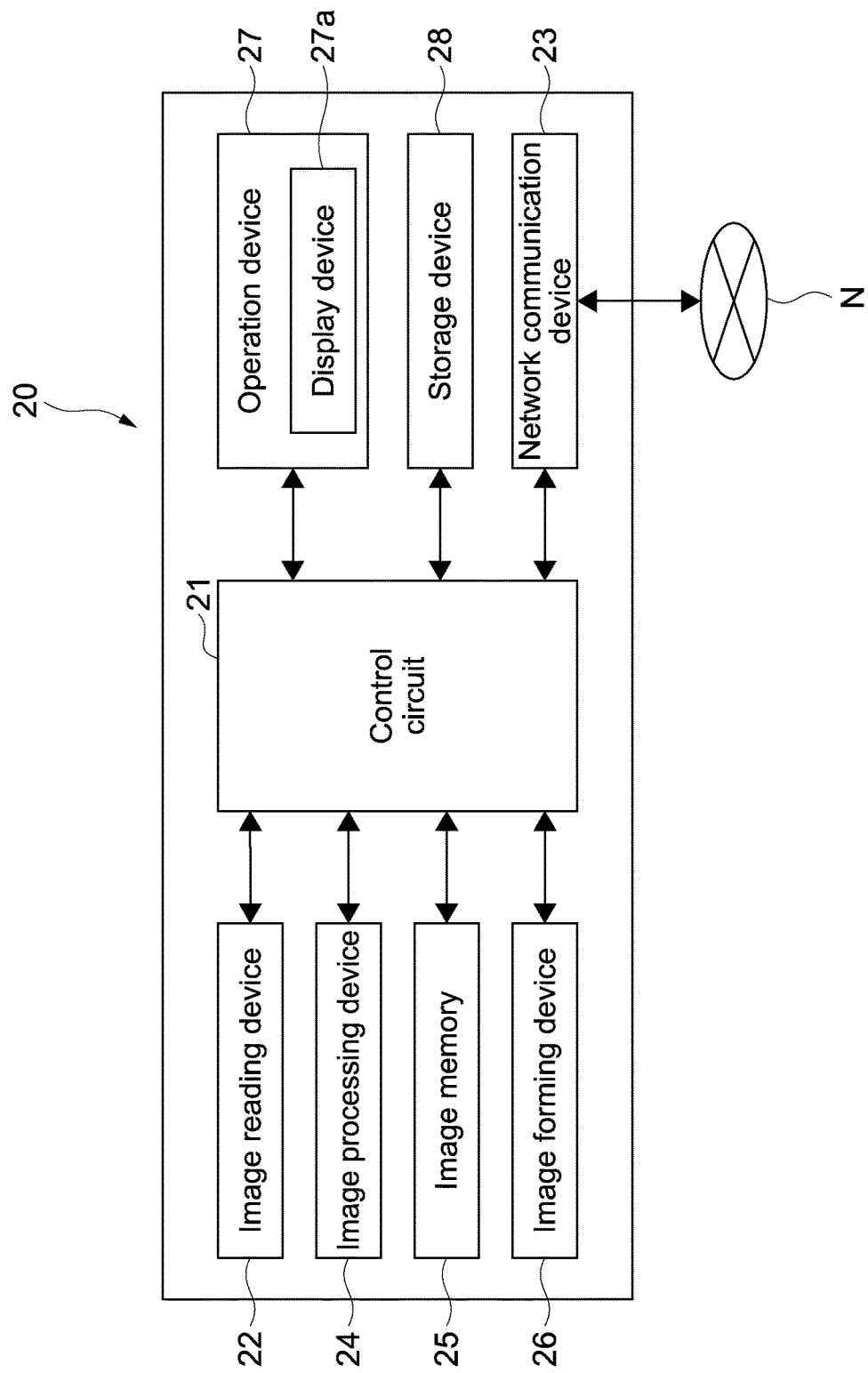
FIG. 3 shows a hardware configuration of an MFP.

FIG. 3 shows a hardware configuration of the MFP according to the first embodiment of the present disclosure.

The MFP 20 includes a control circuit 21. The control circuit 21 includes a CPU (Central Processing Unit), a RAM (Random Access Memory), a ROM (Read Only Memory), dedicated hardware circuits, and the like and performs overall operational control of the MFP 20. A computer program that causes the MFP 20 to operate as the respective functional units (to be described later) is stored in a non-transitory computer readable recording medium such as a ROM.

The control circuit 21 is connected to an image reading device 22, an image processing device 24, an image memory 25, an image forming device 26, an operation device 27, a storage device 28, a network communication device 23, and the like. The control circuit 21 performs operational control of the respective devices connected thereto and exchanges signals and data with those devices.

According to job execution instructions input by a user via the operation device 27 or a personal computer (not shown) connected to the network N, the control circuit 21 controls drive and processing of mechanisms requisite for executing operational control of functions such as a scanner function, a printing function, and a copy function.

The image reading device 22 reads an image from a script.

The image processing device 24 carries out image processing as necessary on image data of an image read by the image reading device 22. For example, the image processing device 24 carries out image processing such as shading correction for improving image quality after an image read by the image reading device 22 is formed.

The image memory 25 includes an area that temporarily stores data of a script image read by the image reading device 22 or data to be printed by the image forming device 26.

The image forming device 26 forms an image of image data and the like read by the image reading device 22.

The operation device 27 includes a touch panel device and an operation key device that accept user instructions on various operations and processing that can be executed by the MFP 20. The touch panel device includes a display device 27a such as an LCD (Liquid Crystal Display) equipped with a touch panel.

The network communication device 23 is an interface used for connecting to the network N.

The storage device 28 is a large-volume storage device such as an HDD (Hard Disk Drive) that stores a script image read by the image reading device 22, and the like.

(3. Functional Configuration of Information Processing Apparatus and Image Forming Apparatus)

Figure 4:
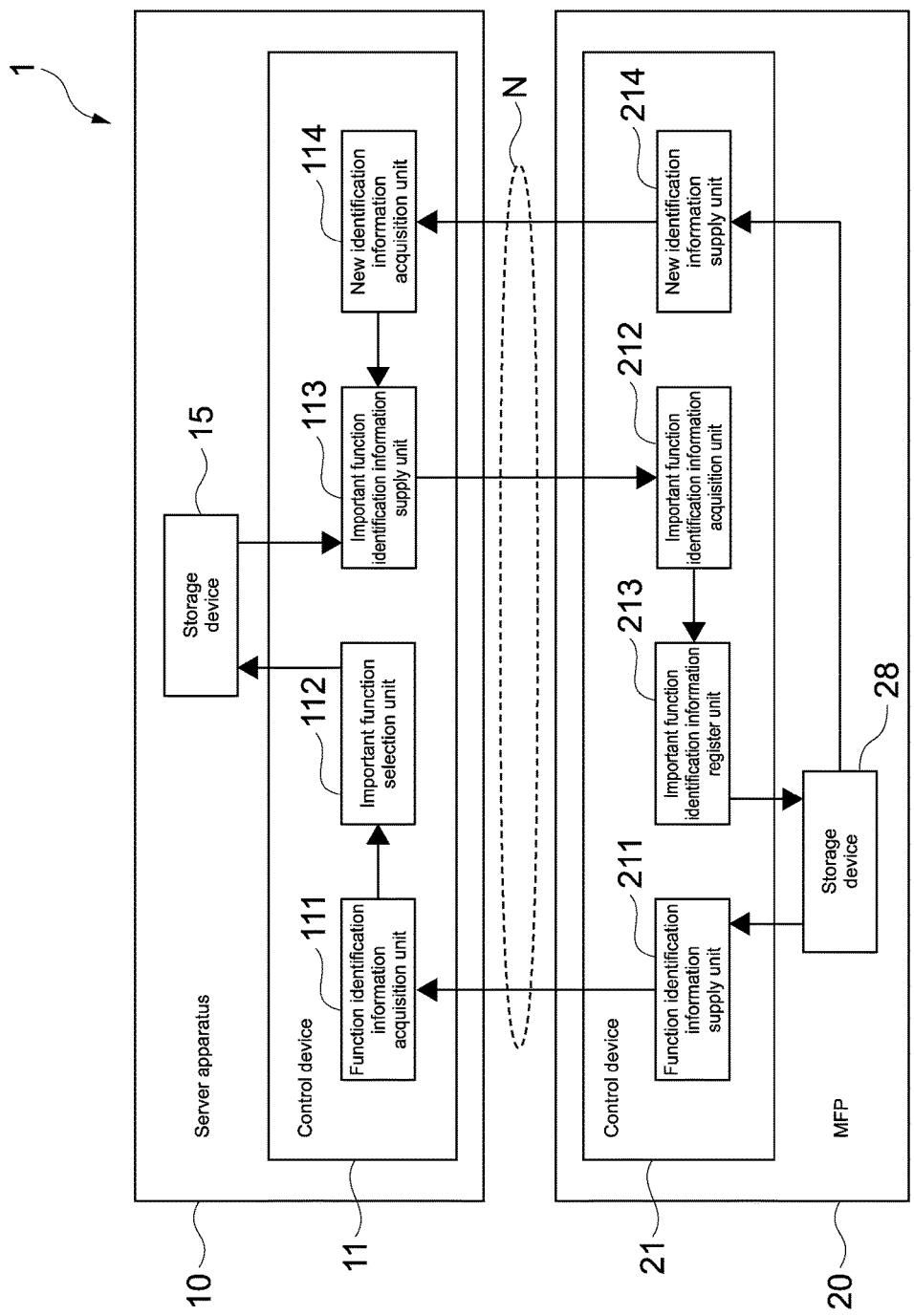
FIG. 4 shows functional configurations of the information processing apparatus and the MFP.

FIG. 4 shows functional configurations of the information processing apparatus and the MFP according to the first embodiment of the present disclosure.

By loading an information processing program stored in the ROM as an example of a non-transitory computer-readable recording medium in the RAM and executing it, the server apparatus 10 functions as a function identification information acquisition unit 111 (a function identification information acquisition circuit), an important function selection unit 112 (an important function selection circuit), an important function identification information supply unit 113 (an important function identification information supply circuit), and a new identification information acquisition unit 114 (a new identification information acquisition circuit).

The function identification information acquisition unit 111 acquires apparatus identification information and pieces of function identification information associated with respective pieces of user identification information from the MFP 20.

The important function selection unit 112 selects a function with high importance for the MFP 20 based on the pieces of function identification information associated with the respective pieces of user identification information acquired from the function identification information acquisition unit 111.

The important function identification information supply unit 113 acquires apparatus identification information and new user identification information from the new identification information acquisition unit 114.

The new identification information acquisition unit 114 acquires apparatus identification information and new user identification information from the MFP 20.

By executing an information processing program, the MFP 20 functions as a function identification information supply unit 211 (a function identification information supply circuit), an important function identification information acquisition unit 212 (an important function identification information acquisition circuit), an important function identification information register unit 213 (an important function identification information register circuit), and a new identification information supply unit 214 (new identification information supply circuit).

The function identification information supply unit 211 supplies apparatus identification information for uniquely identifying the MFP 20 itself and pieces of function identification information associated with respective pieces of user identification information registered in the storage device 28 to the server apparatus 10.

The important function identification information acquisition unit 212 acquires user identification information and important function identification information from the server apparatus 10.

The important function identification information register unit 213 acquires user identification information and important function identification information from the important function identification information acquisition unit 212.

The new identification information supply unit 214 supplies apparatus identification information for uniquely identifying the MFP 20 itself and new user identification information registered in the storage device 28 to the server apparatus 10.

(4. Operation of Information Processing System)

Figure 5:
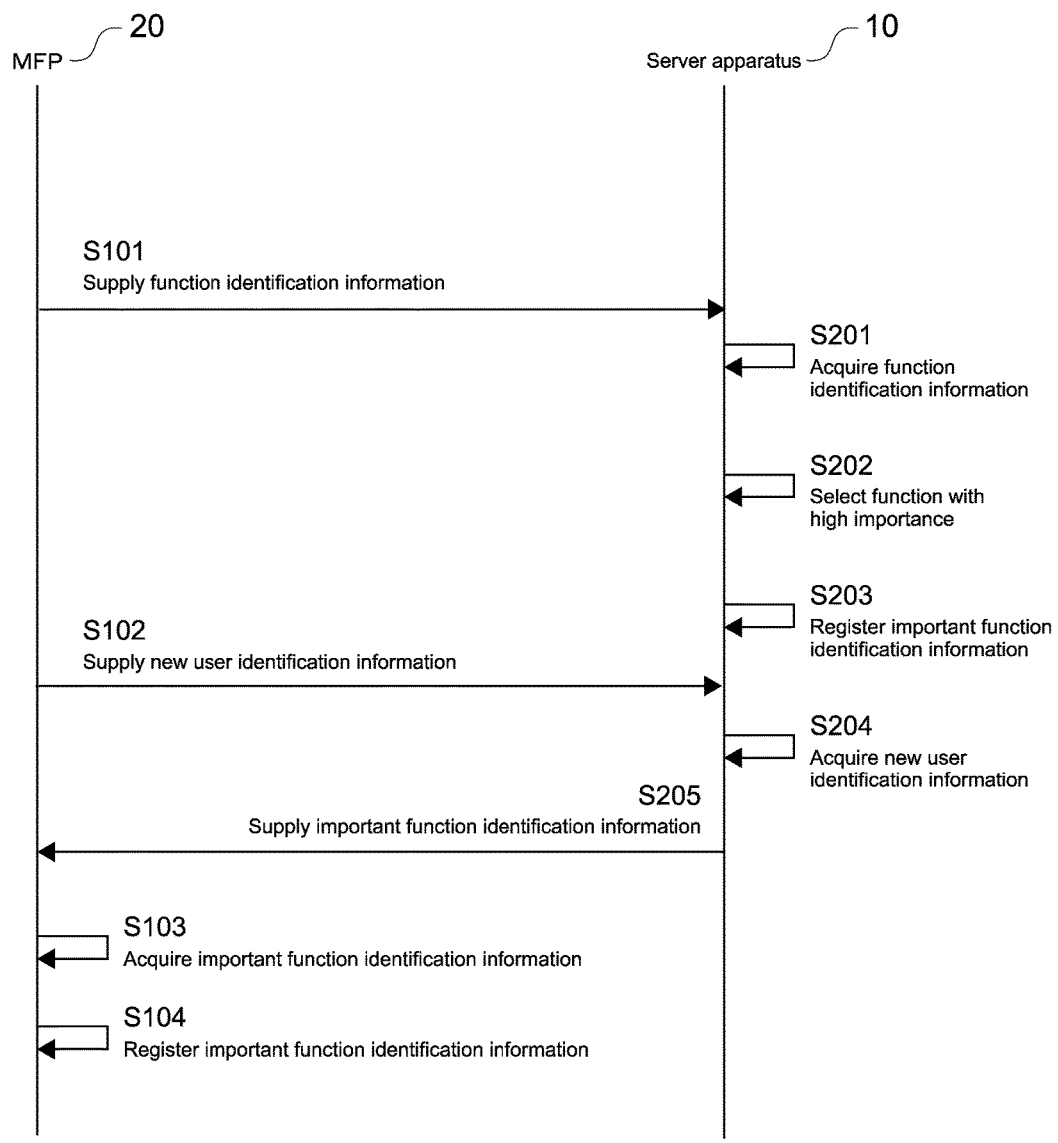
FIG. 5 shows an operational sequence of the information processing system.
Figure 6:
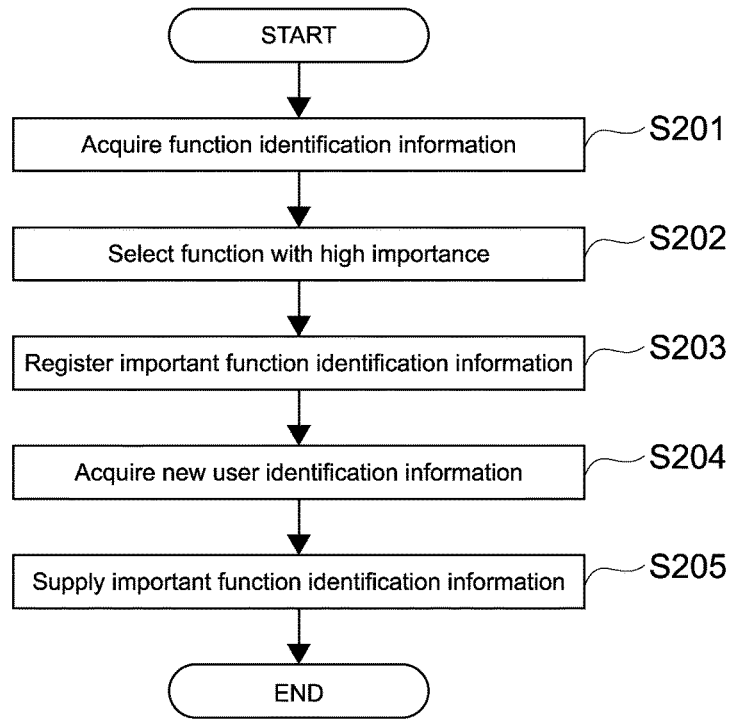
FIG. 6 shows an operational flow of the information processing apparatus.
Figure 7:
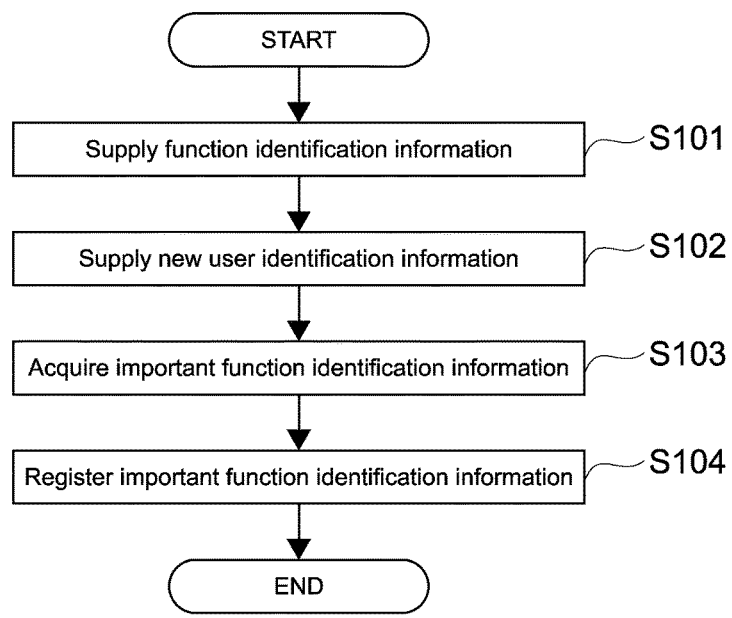
FIG. 7 shows an operational flow of the MFP.

FIG. 5 shows an operational sequence of the information processing system. FIG. 6 shows an operational flow of the information processing apparatus. FIG. 7 shows an operational flow of the MFP.

As a presupposition, pieces of user identification information "user A", "user B", and "user C" are registered in the storage device 28 of the MFP 20. "The user identification information" is typically a user ID uniquely assigned to a user by the MFP 20 when the MFP 20 registers the user. In addition, function identification information for identifying a function that a user registers as a favorite function is registered in relation to the user identification information for identifying the user in the storage device 28. "The function identification information" is for uniquely identifying a plurality of functions (a printing function, a scan function, a transfer function, a FAX function, etc.) that the MFP 20 can execute.

In the present example, function identification information and user identification information are registered in advance in the storage device 28 in relation to each other as follows.

Function identification information "function A" in relation to the user identification information "user A"

Function identification information "function A" in relation to the user identification information "user B"

Function identification information "function B" in relation to the user identification information "user C"

The function identification information supply unit 211 of the MFP 20 supplies apparatus identification information for uniquely identifying the MFP 20 itself and pieces of function identification information associated with respective pieces of user identification information registered in the storage device 28 to the server apparatus 10 (Step S101). In the present example, the function identification information supply unit 211 supplies the function identification information "function A" associated with the user identification information "user A", the function identification information "function A" associated with the user identification information "user B", and the function identification information "function B" associated with the user identification information "user C" to the server apparatus 10.

The function identification information acquisition unit 111 of the server apparatus 10 acquires apparatus identification information and pieces of function identification information associated with respective pieces of user identification information from the MFP 20 (Step S201). The function identification information acquisition unit 111 supplies the important function selection unit 112 with the apparatus identification information and the pieces of function identification information associated with the pieces of user identification information acquired from the MFP 20.

The important function selection unit 112 of the server apparatus 10 selects a function with high importance for the MFP 20 based on the pieces of function identification information associated with the pieces of user identification information acquired from the function identification information acquisition unit 111 (Step S202). Specifically, the important function selection unit 112 compares the total number of pieces of user identification information associated with the function identification information with each other, and determines the function identification information with the highest total number of pieces of user identification information. The important function selection unit 112 selects the function identified by the function identification information determined to have the highest total number of pieces of user identification information, as a function with high importance.

In the present example, the important function selection unit 112 calculates that the total number of pieces of user identification information ("user A" and "user B") associated with the function identification information "function A" is "2", and the total number of pieces of user identification information ("user C") associated with the function identification information "function B" is "1". The important function selection unit 112 compares the total number "2" of pieces of user identification information associated with the function identification information "function A" with the total number "1" of pieces of user identification information associated with the function identification information "function B", and determines the function identification information "function A" with the total number of pieces of user identification information being "2". The important function selection unit 112 selects the function identified by the function identification information "function A" with the total number of pieces of user identification information being the maximum value "2", as a function with high importance for the MFP 20. The important function selection unit 112 registers the apparatus identification information of the MFP 20 and the function identification information "function A" of the function selected as a function with high importance (important function identification information) in the storage device 15 in relation to each other (Step S203).

Meanwhile, new user identification information "user D" is registered in the storage device 28 of the MFP 20. No function identification information for identifying a function registered as a favorite function is registered for the new user identification information "user D". The new identification information supply unit 214 of the MFP 20 supplies apparatus identification information for uniquely identifying the MFP 20 itself and the new user identification information "user D" registered in the storage device 28 to the server apparatus 10 (Step S102).

The new identification information acquisition unit 114 of the server apparatus 10 acquires the apparatus identification information and the new user identification information "user D" from the MFP 20 (Step S204). The new identification information acquisition unit 114 supplies the apparatus identification information and the new user identification information "user D" to the important function identification information supply unit 113.

The important function identification information supply unit 113 of the server apparatus 10 acquires the apparatus identification information and the new user identification information "user D" from the new identification information acquisition unit 114. The important function identification information supply unit 113 reads, from the storage device 15, the important function identification information "function A" associated with the acquired apparatus identification information. The important function identification information supply unit 113 supplies the user identification information "user D" acquired from the new identification information acquisition unit 114 and the important function identification information "function A" read from the storage device 15 to the MFP 20 identified by the apparatus identification information acquired from the new identification information acquisition unit 114 (Step S205).

The important function identification information acquisition unit 212 of the MFP 20 acquires the user identification information "user D" and the important function identification information "function A" from the server apparatus 10 (Step S103). The important function identification information acquisition unit 212 supplies the acquired user identification information "user D" and the acquired important function identification information "function A" to the important function identification information register unit 213.

The important function identification information register unit 213 of the MFP 20 acquires the user identification information "user D" and the important function identification information "function A" from the important function identification information acquisition unit 212. The important function identification information register unit 213 registers the important function identification information "function A" in the storage device 28 in relation to the acquired user identification information "user D" (Step S104).

In the first embodiment, a function with the highest total number of pieces of user identification information is selected as a function with high importance. Accordingly, it is possible to select a function with high importance and present the selected function to a user while reflecting the taste of users. The MFP 20 can present a function with high importance to the user identified by the user identification information "user D" by, for example, displaying the function with high importance on the display device 27a (FIG. 3) when the user logs in the MFP 20.

Note that the control circuit 21 of the MFP 20 may register the "function A" registered in Step S104, in the storage device 28 in relation to the "user D".

Accordingly, the MFP 20 in which a function with high importance is not registered can register in advance the function with high importance selected by the server apparatus 10. Alternatively, the MFP 20 can register in advance the function with high importance selected by the server apparatus 10 for a user who does not register the function with high importance.

In addition, a new MFP 20 can register in advance the function with high importance selected by the server apparatus 10. Alternatively, the MFP 20 can register in advance the function with high importance selected by the server apparatus 10 for a new user.

(II. Second Embodiment)

In the following embodiments and modified examples, descriptions on configurations, operations, and the like similar to those described above will be omitted, and different points will be mainly described.

In the first embodiment, the important function selection unit 112 of the server apparatus 10 selects the function identified by the function identification information determined to have the highest total number of pieces of user identification information, as a function with high importance. Meanwhile, in a second embodiment, the important function selection unit 112 of the server apparatus 10 selects the function with the highest number of executions as a function with high importance.

The system configuration diagram, each block diagram, the sequence diagram, and each flowchart of the second embodiment are the same as those of the first embodiment. Therefore, illustration thereof will be omitted and descriptions will be made with the same reference symbols and the same step numbers.

As a presupposition, for user identification information, function identification information for identifying a function registered as a favorite function by the user identified by the user identification information, and number-of-executions information that represents the number of executions of the function by the user are registered in the storage device 28 of the MFP 20 in relation to each other.

In the present example, for user identification information, function identification information and number-of-executions information are registered in advance in the storage device 28 in relation to each other as follows.

Function identification information "function A" and number-of-executions information "2" of the function for user identification information "user A"

Function identification information "function A" and number-of-executions information "7" of the function for user identification information "user B"

Function identification information "function C" and number-of-executions information "6" of the function for user identification information "user C"

The function identification information supply unit 211 of the MFP 20 supplies apparatus identification information for uniquely identifying the MFP 20 itself, and pieces of function identification information and number-of-executions information associated with respective pieces of user identification information registered in the storage device 28 to the server apparatus 10 (Step S101). In the present example, the function identification information supply unit 211 supplies the function identification information "function A" and number-of-executions information "2" associated with the user identification information "user A", the function identification information "function A" and number-of-executions information "7" associated with user identification information "user B", and the function identification information "function C" and number-of-executions information "6" associated with the user identification information "user C" to the server apparatus 10.

The function identification information acquisition unit 111 of the server apparatus 10 acquires the apparatus identification information and the pieces of function identification information and number-of-executions information associated with the pieces of user identification information from the MFP 20 (Step S201). The function identification information acquisition unit 111 supplies, to the important function selection unit 112, the apparatus identification information and the pieces of function identification information and number-of-executions information associated with the pieces of user identification information acquired from the MFP 20.

The important function selection unit 112 of the server apparatus 10 selects a function with high importance for the MFP 20 based on the pieces of function identification information and number-of-executions information acquired from the function identification information acquisition unit 111 (Step S202). Specifically, the important function selection unit 112 compares the total number of executions represented by the pieces of number-of-executions information associated with the pieces of function identification information with each other, and determines the function identification information with the highest total number of executions. The important function selection unit 112 selects the function identified by the function identification information determined to have the highest total number of executions, as a function with high importance.

In the present example, the important function selection unit 112 calculates that the total number of times represented by the pieces of number-of-executions information ("2" and "7") associated with the function identification information "function A" is "9" and the total number of times represented by the number-of-executions information ("6") associated with the function identification information "function C" is "6". The important function selection unit 112 compares the total number "9" of times represented by the pieces of number-of-executions information associated with the function identification information "function A" with the total number "6" of times represented by the number-of-executions information associated with the function identification information "function C", and determines the function identification information "function A" with the total number of times represented by number-of-executions information being the maximum value "9". The important function selection unit 112 selects the function identified by the function identification information "function A" with the highest total number of times represented by number-of-executions information being the maximum value "9", as a function with high importance for the MFP 20. The important function selection unit 112 registers the apparatus identification information of the MFP 20 and the function identification information "function A" of the function selected as a function with high importance (important function identification information) in the storage device 15 in relation to each other (Step S203). The subsequent processing executed by the server apparatus 10 and the MFP 20 is the same as that of the first embodiment.

According to the second embodiment, the important function selection unit 112 of the server apparatus 10 selects the function with the highest total number of times represented by number-of-executions information, as a function with high importance. In the first embodiment, a function with high importance is selected on the basis of the number of users who register the function as a favorite function, and whether or not the function is actually executed and the execution frequency of the function are not considered when selecting a function with high importance. Meanwhile, in the second embodiment, a function with high importance is selected on the basis of not the number of users who register the function as a favorite function but the actual execution frequency of the function. Accordingly, it is possible to objectively and accurately select a function with high importance as compared with the first embodiment, and present the selected function to a user.

(III. Third Embodiment)

Figure 8:
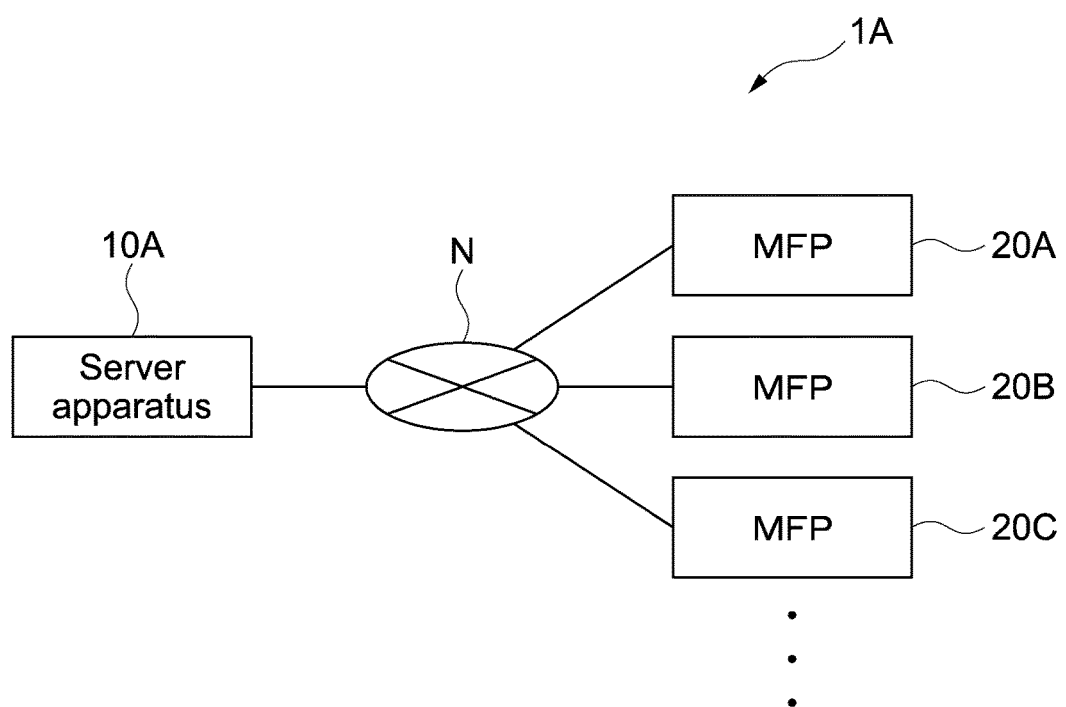
FIG. 8 schematically shows an information processing system according to a third embodiment of the present disclosure.

FIG. 8 schematically shows an information processing system according to a third embodiment of the present disclosure.

An information processing system 1A includes a server apparatus 10A and a plurality of MFPs 20A, 20B, 20C, . . . that can exchange information with each other through bidirectional communication via the network N. In the present example, the plurality of MFPs include the three MFPs 20A, 20B, and 20C.

In the first embodiment, the important function selection unit 112 of the server apparatus 10 selects the function identified by the function identification information determined to have the highest total number of times represented by user identification information, as a function with high importance for a particular MFP 20. Meanwhile, in the third embodiment, the important function selection unit 112 of the server apparatus 10A selects a function with high importance for a new different MFP based on functions registered in the plurality of MFPs 20A, 20B, and 20C as a favorite function. In other words, in the third embodiment, the important function selection unit 112 of the server apparatus 10A does not use user identification information when selecting a function with high importance unlike the first embodiment.

Each block diagram and each flowchart of the third embodiment are the same as those of the first embodiment. Therefore, illustration thereof will be omitted and descriptions will be made with the same reference symbols and the same step numbers.

As a presupposition, in the storage device 28 of each of the MFPs 20A, 20B, and 20C, function identification information for identifying a function registered by the user of the corresponding MFP as a favorite function is registered.

In the present example, pieces of function identification information are registered in advance in the storage devices 28 of the MFPs 20A, 20B, and 20C as follows.

Function identification information "function A" in the MFP 20A

Function identification information "function A" in the MFP 20B

Function identification information "function B" in the MFP 20C

The function identification information supply devices 211 of the MFPs 20A, 20B, and 20C supply respective pieces of apparatus identification information (referred to as "MFP 20A", "MFP 20B", and "MFP 20C", for convenience) for uniquely identifying the MFPs 20A, 20B, and 20C themselves, and respective pieces of function identification information registered in the corresponding storage device 28 to the server apparatus 10 (Step S101). In the present example, the function identification information supply unit 211 of the MFP 20A, the function identification information supply unit 211 of the MFP 20B, and the function identification information supply unit 211 of the MFP 20 respectively supply the server apparatus 10A with the apparatus identification information "MFP 20A" and the function identification information "function A", the apparatus identification information "MFP 20B" and the function identification information "function A", and the apparatus identification information "MFP 20C" and the function identification information "function B".

The function identification information acquisition unit 111 of the server apparatus 10A acquires the respective pieces of apparatus identification information and the respective pieces of function identification information from the MFPs 20A, 20B, and 20C (Step S201). The function identification information acquisition unit 111 supplies the important function selection unit 112 with the pieces of apparatus identification information and the pieces of function identification information acquired from the MFP 20A, 20B, and 20C.

The important function selection unit 112 of the server apparatus 10A selects a function with high importance for the MFPs 20A, 20B, and 20C based on the pieces of function identification information and the pieces of function identification information acquired from the function identification information acquisition unit 111 (Step S202). Specifically, the important function selection unit 112 compares the total number of pieces of apparatus identification information associated with function identification information with each other, and determines function identification information with the highest total number of pieces of apparatus identification information. The important function selection unit 112 selects the function identified by the function identification information determined to have the highest total number of pieces of apparatus identification information, as a function with high importance.

In the present example, the important function selection unit 112 calculates that the total number of pieces of apparatus identification information ("MFP 20A" and "MFP 20B") associated with the function identification information "function A" is "2" and the total number of apparatus identification information ("MFP 20C") associated with the function identification information "function B" is "1". The important function selection unit 112 compares the total number "2" of pieces of apparatus identification information associated with the function identification information "function A" with the total number "1" of pieces of apparatus identification information associated with the function identification information "function B", and determines the function identification information "function A" with the total number of pieces of apparatus identification information being the maximum value "2". The important function selection unit 112 selects the function identified by the function identification information "function A" with the total number of pieces of apparatus identification information being the maximum value "2", as a function with high importance for a new different MFP. The important function selection unit 112 registers the function identification information "function A" of the function selected as a function with high importance (important function identification information) in the storage device 15 (Step S203).

Meanwhile, the new identification information acquisition unit 114 of the server apparatus 10A acquires new apparatus identification information (referred to as "MFP 20D") from a new MFP 20D (Step S204). The new identification information acquisition unit 114 supplies the new apparatus identification information "MFP 20D" to the important function identification information supply unit 113.

The important function identification information supply unit 113 of the server apparatus 10A acquires the new apparatus identification information "MFP 20D" from the new identification information acquisition unit 114. The important function identification information supply unit 113 reads the important function identification information "function A" from the storage device 15. The important function identification information supply unit 113 supplies the important function identification information "function A" read from the storage device 15 to the MFP 20D identified by the new apparatus identification information acquired from the new identification information acquisition unit 114 (Step S205).

The important function identification information acquisition unit 212 of the MFP 20D acquires the important function identification information "function A" from the server apparatus 10A (Step S103). The important function identification information acquisition unit 212 supplies the acquired important function identification information "function A" to the important function identification information register unit 213.

The important function identification information register unit 213 of the MFP 20D acquires the important function identification information "function A" from the important function identification information acquisition unit 212. The important function identification information register unit 213 registers the acquired important function identification information "function A" in the storage device 28 (Step S104).

Accordingly, the new MFP 20D can present, to a user, a function with high importance (in the present example, a function registered in two MFPs identified by pieces of apparatus identification information "MFP 20A" and "MFP 20B" as a favorite function) selected by reflecting the taste of users by, for example, displaying the function with high importance on the display device 27a (FIG. 3).

Note that the control circuit 21 of the MFP 20 may register the "function A" registered in Step S104, in the storage device 28 in relation to the "user D".

(IV. Modified Example)
(1. Modified Example 1)

In the third embodiment, the server apparatus 10A selects the function identified by the function identification information determined to have the highest total number of pieces of apparatus identification information as a function with high importance, and supplies information for identifying the selected function (important function identification information) to the new MFP 20D registered in the server apparatus 10A. Meanwhile, the important function selection device of the server apparatus may select the function with the highest total number of times represented by number-of-executions information representing the number of executions by a plurality of MFPs as a function with high importance, and supply information for identifying the selected function (important function identification information) to a new MFP registered in the server apparatus, similarly to the second embodiment. Accordingly, it is possible to objectively and accurately select a function with high importance and present the selected function to a user, similarly to the second embodiment.

(2. Modified Example 2)

In the first embodiment and the second embodiment, the server apparatus 10 acquires the new user identification information "user D" from the MFP 20 before supplying the important function identification information "function A" to the MFP 20 (Step S204). Meanwhile, in the case where pieces of user identification information are already registered in the server apparatus 10 and there is user identification information that is not associated with important function identification information, the server apparatus 10 may transmit the user identification information and the important function identification information to the MFP 20.

In the case of the example of the first embodiment, the server apparatus 10 transmits the user identification information "user C" (associated with only the function identification information "function B") and the important function identification information "function A" to the MFP 20. In the case of the second embodiment, the server apparatus 10 transmits the user identification information "user C" (associated with only the function identification information "function C") and the important function identification information "function A" to the MFP 20.

The MFP 20 can present a function with high importance to the user identified by the user identification information "user C" by, for example, displaying the function with high importance on the display device 27a (FIG. 3) when the user logs in the MFP 20, even when the user does not voluntarily register the "function A" as a favorite function.

(3. Modified Example 3)

In the third embodiment and the modified example 1, the server apparatus 10A acquires the new apparatus identification information "MFP 20D" before supplying the important function identification information "function A" to the new MFP 20D (Step S204). Meanwhile, in the case where pieces of apparatus identification information are already registered in the server apparatus 10A and there is apparatus identification information that is not associated with important function identification information, the server apparatus 10A may transmit the important function identification information to the MFP 20.

In the case of the example of the third embodiment, the server apparatus 10A transmits the important function identification information "function A" to the MFP 20C identified by the apparatus identification information "MFP 20C" (associated with only the function identification information "function B").

The MFP 20C can present a function with high importance to the user of the MFP 20C by, for example, displaying the function with high importance on the display device 27a (FIG. 3), even when the user does not voluntarily register the "function A" as a favorite function.

(4. Modified Example 4)

In the first embodiment, a function with high importance is selected on the basis of the number of users who register the function as a favorite function, and whether or not the function is actually executed and the execution frequency of the function are not considered when selecting a function with high importance. Meanwhile, in the second embodiment, a function with high importance is selected on the basis of not the number of users who register the function as a favorite function but the actual total number of executions of the function. Meanwhile, a function with high importance may be selected on the basis of the number of users who register the function as a favorite function and the actual total number of executions of the function. Accordingly, it is possible to objectively and accurately select a function with high importance while reflecting the taste of users more based on the actual total number of executions of the function, and present the selected function to a user.

(5. Modified Example 5)

In the third embodiment, a function with high importance is selected on the basis of the number of MFPs in which the function is registered as a favorite function, and whether or not the function is actually executed and the execution frequency of the function are not considered when selecting a function with high importance. Meanwhile, in the modified example 1, a function with high importance is selected on the basis of not the number of MFPs in which the function is registered as a favorite function but the actual total number of executions of the function. Meanwhile, a function with high importance may be selected on the basis of the number of MFPs in which the function is registered as a favorite function and the actual total number of executions of the function. Accordingly, it is possible to objectively and accurately select a function with high importance while reflecting the taste of users more based on the actual total number of executions of the function, and present the selected function to a user.

(6. Modified Example 6)

Although the server apparatus selects one function with high importance in each embodiment and each modified example, the server apparatus may select a plurality of functions with high importance.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a function identification information acquisition circuit that acquires function identification information for identifying a favorite function from one or more electronic apparatuses executing a plurality of functions, the function identification information being associated with one of apparatus identification information for identifying the one or more electronic apparatuses and user identification information for identifying one or more users registered in the one or more electronic apparatuses, the favorite function being registered by the one or more users out of the plurality of functions;
an important function selection circuit that selects a function with high importance from the plurality of functions based on the acquired function identification information for identifying the favorite function, the function with high importance being a function identified by the function identification information determined to have the highest total number of pieces of user identification information identifying the one or more users who registered the function with high importance as the favorite function; and
an important function identification information supply circuit that supplies important function identification information to one of an electronic apparatus identified by the apparatus identification information that is not associated with the important function identification information and an electronic apparatus in which user identification information that is not associated with the important function identification information is registered, the important function identification information being for identifying the function with high importance.

2. The information processing apparatus according to claim 1, further comprising
a new identification information acquisition circuit that acquires one of apparatus identification information that is not associated with the function identification information and user identification information that is not associated with the function identification information, wherein
the important function identification information supply circuit supplies the important function identification information to one of an electronic apparatus identified by the apparatus identification information acquired by the new identification information acquisition circuit and an electronic apparatus in which the user identification information acquired by the new identification information acquisition circuit is registered.

3. The information processing apparatus according to claim 2, wherein
the important function selection circuit selects a function with the highest total number of pieces of user identification information associated with the acquired function identification information as the function with high importance.

4. The information processing apparatus according to claim 2, wherein
the function identification information acquisition circuit further acquires number-of-executions information associated with the function identification information, the number-of-executions information representing the number of executions of the favorite function identified by the function identification information, and
the important function selection circuit selects a function with the highest total number of executions as the function with high importance.

5. A non-transitory computer readable recording medium that records a program, the program causing a computer of an information processing apparatus to operate as:
a function identification information acquisition circuit that acquires function identification information for identifying a favorite function from one or more electronic apparatuses executing a plurality of functions, the function identification information being associated with one of apparatus identification information for identifying the one or more electronic apparatuses and user identification information for identifying one or more users registered in the one or more electronic apparatuses, the favorite function being registered by the one or more users out of the plurality of functions;
an important function selection circuit that selects a function with high importance from the plurality of functions based on the acquired function identification information for identifying the favorite function, the function with high importance being a function identified by the function identification information determined to have the highest total number of pieces of user identification information identifying the one or more users who registered the function with high importance as the favorite function; and
an important function identification information supply circuit that supplies important function identification information to one of an electronic apparatus identified by the apparatus identification information that is not associated with the important function identification information and an electronic apparatus in which user identification information that is not associated with the important function identification information is registered, the important function identification information being for identifying the function with high importance.

6. An information processing system, comprising:
one or more electronic apparatuses that execute a plurality of functions; and
an information processing apparatus that communicates with the one or more electronic apparatuses, wherein
the one or more electronic apparatuses each include
a function identification information supply circuit that supplies function identification information for identifying a favorite function to the information processing apparatus, the function identification information being associated with one of apparatus identification information for identifying the one or more electronic apparatuses and user identification information for identifying one or more users registered in the one or more electronic apparatus, the favorite function being registered by the one or more users out of the plurality of functions,
the information processing apparatus includes
a function identification information acquisition circuit that acquires the function identification information from the one or more electronic apparatuses, the function identification information being associated with one of the apparatus identification information and the user identification information,
an important function selection circuit that selects a function with high importance from the plurality of functions based on the acquired function identification information for identifying the favorite function, the function with high importance being a function identified by the function identification information determined to have the highest total number of pieces of user identification information identifying the one or more users who registered the function with high importance as the favorite function, and an important function identification information supply circuit that supplies important function identification information to one of an electronic apparatus identified by the apparatus identification information that is not associated with the important function identification information and an electronic apparatus in which user identification information that is not associated with the important function identification information is registered, the important function identification information being for identifying the function with high importance, and the one or more electronic apparatuses each further include an important function identification information acquisition circuit that acquires the important function identification information from the information processing apparatus, and an important function identification information register circuit that registers one of the acquired important function identification information where the electronic apparatus itself is the electronic apparatus identified by the apparatus identification information that is not associated with the important function identification information, and the acquired important function identification information in relation to the user identification information where the electronic apparatus itself is the electronic apparatus in which user identification information that is not associated with the important function identification information is registered.

* * * * *